No. 614,645. Patented Nov. 22, 1898.
H. R. BIRD.
DEVICE FOR CONVERTING MOTION.
(Application filed July 26, 1897.)
(No Model.) 3 Sheets—Sheet 1.

Witnesses,

Henry R. Bird Inventor.
By James Sangster, Attorney.

No. 614,645. Patented Nov. 22, 1898.
H. R. BIRD.
DEVICE FOR CONVERTING MOTION.
(Application filed July 26, 1897.)

(No Model.) 3 Sheets—Sheet 2.

Witnesses,

Henry R. Bird Inventor.

By James Sangster Attorney.

No. 614,645. Patented Nov. 22, 1898.
H. R. BIRD.
DEVICE FOR CONVERTING MOTION.
(Application filed July 26, 1897.)
(No Model.) 3 Sheets—Sheet 3.
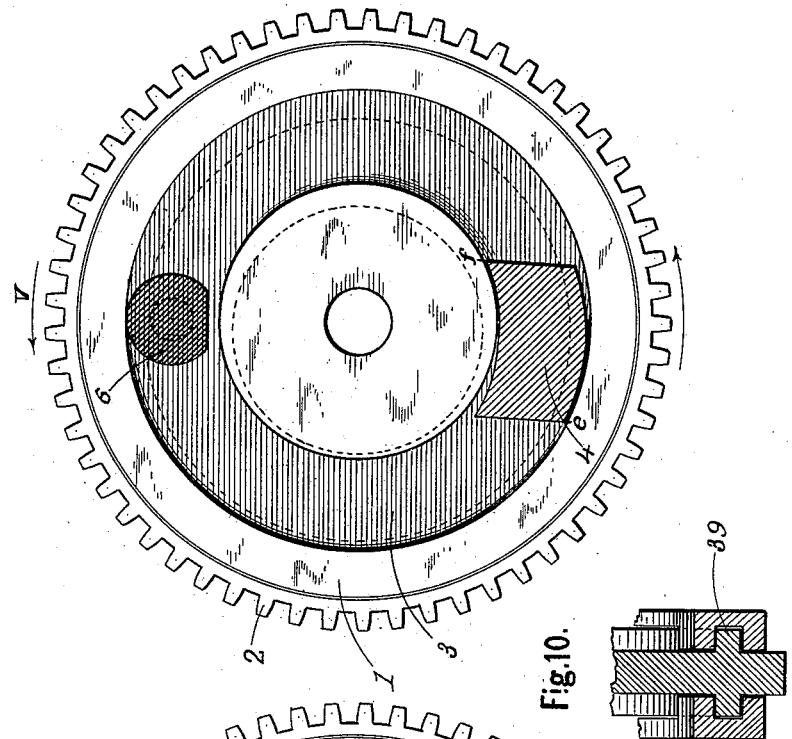
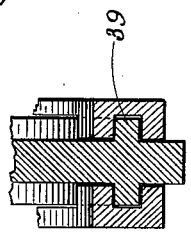
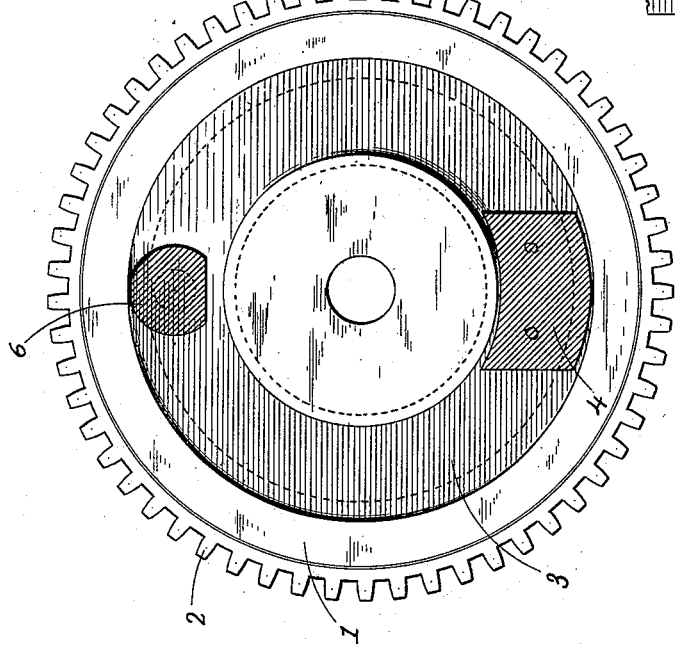
Witnesses, Henry R. Bird. Inventor.
By James Sangster Attorney.

UNITED STATES PATENT OFFICE.

HENRY R. BIRD, OF BUFFALO, NEW YORK.

DEVICE FOR CONVERTING MOTION.

SPECIFICATION forming part of Letters Patent No. 614,645, dated November 22, 1898.

Application filed July 26, 1897. Serial No. 645,906. (No model.)

*To all whom it may concern:*

Be it known that I, HENRY R. BIRD, a citizen of the United States, residing at Buffalo, in the county of Erie and State of New York, have invented certain new and useful Improvements in Devices for Converting Motion for Horseless Wagons or other Purposes, of which the following is a specification.

My invention relates to an improved device for converting reciprocating motion into circular motion for operating a horseless wagon and other purposes, and will be fully and clearly hereinafter described and claimed, reference being had to the accompanying drawings, in which—

Figure 1:
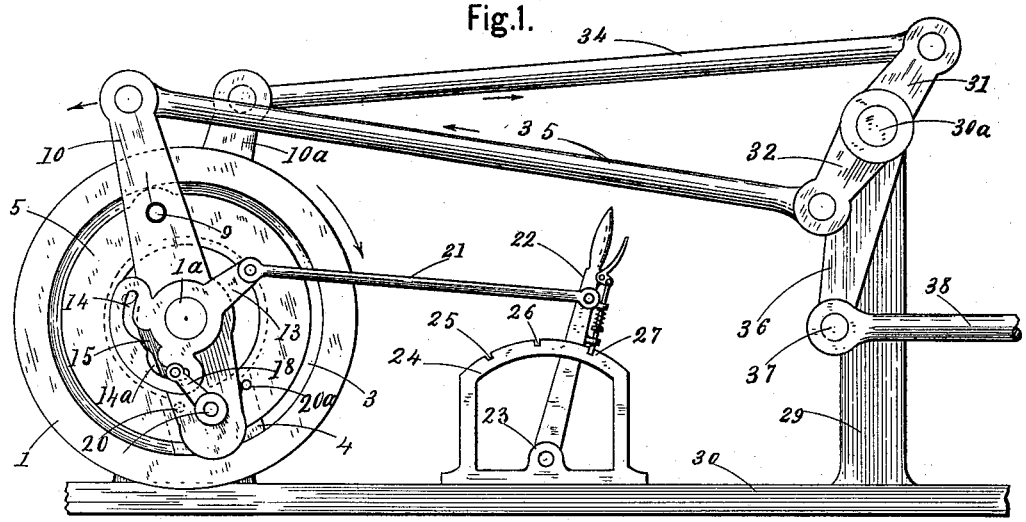
Figure 2:
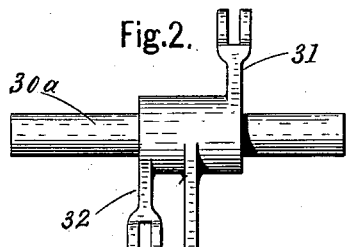
Figure 3:
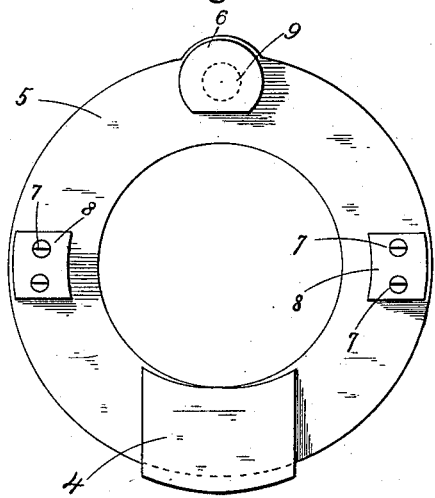
Figure 4:
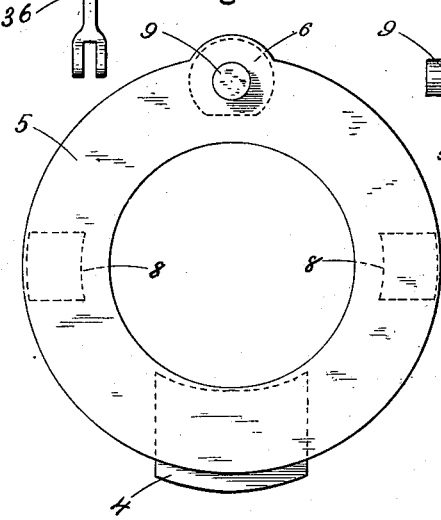
Figure 5:
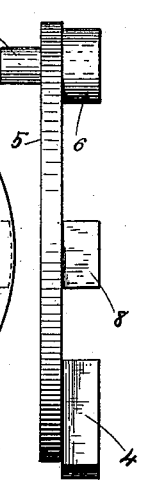
Figure 7:
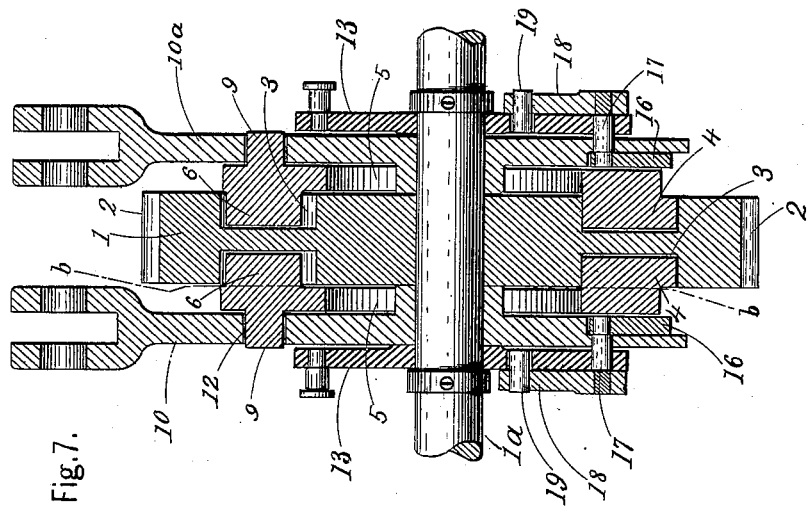
Figure 6:
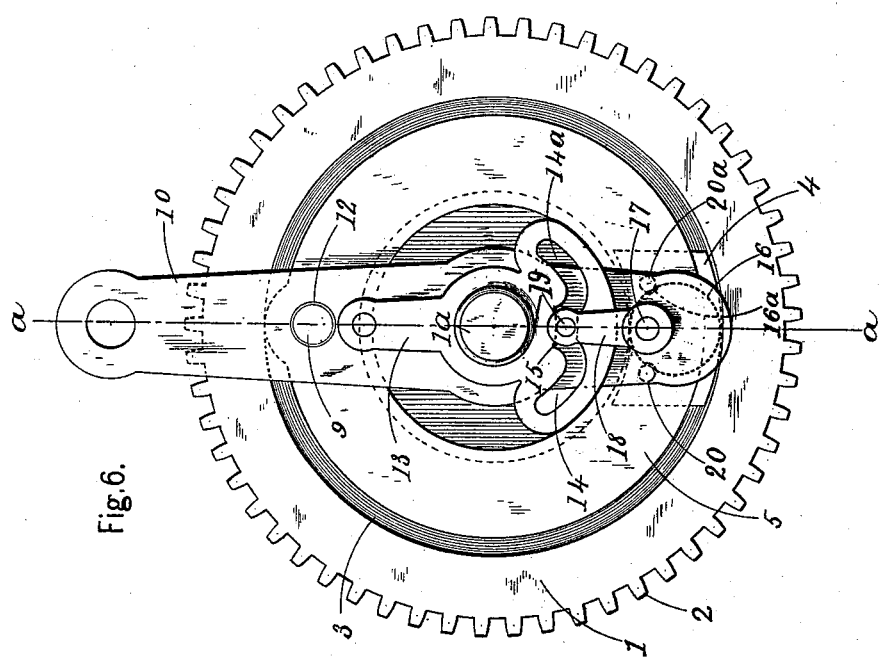

Figure 1 represents a side elevation of the device complete. Fig. 2 represents a detached front elevation of the rock-arm for imparting a reciprocating motion. Fig. 3 represents an inside elevation of one of the clutch-rings for producing a circular motion. Fig. 4 represents an outside or front elevation of one of the clutch-rings. Fig. 5 represents a side elevation of one of said clutch-rings. Fig. 6 represents a detached front elevation of the device, showing also a similar view of the reversing mechanism. Fig. 7 represents a vertical central section on or about line $a\,a$, Fig. 6. Fig. 8 represents a front elevation, showing a vertical section on or about line $b\,b$, Fig. 7, cutting through the clutch-block and pivotal hub of the clutch-ring and showing the clutch-block out of action. Fig. 9 represents a similar section, showing the clutch-block while in action. Fig. 10 is a sectional elevation of a portion of the device, showing a modification of the clutch mechanism.

The object of the first part of my invention is to convert a reciprocating motion into a noiseless rotary motion, and thereby avoid the wear and noise incident to toothed gearing, which I accomplish by means of a disk having circular grooves in which clutch devices fit, said clutch devices having their inner and outer sides curved to a lesser and greater degree, respectively, than the inner and outer side walls of the grooves.

The object of the second part of my invention is to combine with the operating mechanism a suitable means for reversing its action and to provide a convenient means for stopping or starting the rotary movement while the reciprocating movement is in action.

Referring to the accompanying drawings for the details of the construction, in Fig. 1 I have shown a plain disk 1, and in Figs. 6, 7, 8, and 9 the disk 1 is represented with a series of spur-gear teeth 2, extending around its periphery, adapting it to gear into a corresponding spur gear-wheel or pinion when it is desired to multiply or diminish the number of the rotary movements.

The rotary disk 1 is rigidly attached to its shaft $1^a$, and is provided at both sides with a circular groove 3. (See Figs. 1, 6, 7, 8, and 9.) In this annular groove the clutch-block 4 operates, the said block having its outer side curved to a greater degree than the outer circular side wall of the groove and its inner side curved to a lesser degree than the inner circular side walls of the groove, so that when it is substantially central with the groove there is practically no frictional contact between the side walls of the groove and the sides of the block, and the vibratile movement of the block will not move the disk. When the block is moved to one side or the other of the center, the relative position of the block with respect to the groove is changed and frictional contact between the side walls of the groove and the sides of the block is attained, and when the block is vibrated in the direction to which it has been moved the block frictionally locks itself in the groove and the disk is rotated in that direction. The clutch-block is located on the inner side of the clutch-ring 5 and is either rigidly attached to or, preferably, forms an integral portion of it.

The clutch-block 4 extends down far enough to rest against the bottom of the groove 3. The pivotal hub 6 also rests against the bottom of said groove. There are also attached to the clutch-ring, by means of screws 7, (see Fig. 3,) two wooden blocks 8, which serve to prevent the ring from tipping either to one side or the other. The outside of the clutch-ring is provided near the top with a pivotal pin 9, the use of which will appear farther on.

At each side of the operating-disk is mounted on the shaft $1^a$ an operating-arm 10 and $10^a$. (See Figs. 1, 6, and 7.) These operating-arms 10 and 10ª are mounted so as to turn easily on the shaft 1ª and are each provided with a circular opening 12, into which the pivotal pins 9 of the clutch-rings pass and are nicely fitted so as to turn therein.

From the above description it will be seen that the operating-arms are mounted on the shaft 1ª so as to turn thereon and that the clutch-rings 5 are pivotally supported by the operating-arms, so as to be capable of a slight vibratory movement.

The object in employing two arms 10 and 10ª and two clutch-rings is to provide the means for giving a continuous rotary motion and for reversing the action of the device under these conditions, so that it can easily be made to operate in either direction or its operation stopped while the operating-arms are in action. In describing the reversing-gear reference is had to Figs. 1, 6, and 7, mounted on the shaft 1ª, so as to rest against the arms 10 and 10ª. At each side of the device is a cam-arm 13. It is provided with reversing mechanism consisting of an open cam the portions 14, 14ª, and 15 of which form portions of a circle the center of which is the center of the shaft 1ª. To the lower end of the operating-arms 10 and 10ª, between said arms and their clutch-rings, is a cam or eccentric 16, (see Fig. 6,) where substantially the shape of this eccentric is shown by dotted lines. It is also shown in section in Fig. 7. These cams or eccentrics 16 are each rigidly secured to a pivotal pin 17, which extends through the lower portions of the operating-arms 10 and 10ª and are fitted nicely so as to turn therein. (See Fig. 7.) To the opposite end of each pin 17 is rigidly secured an arm 18, having a pin 19, which extends into the cam-opening 14, 14ª, and 15, as shown in Figs. 6 and 7.

Extending out from the clutch-ring are two pins 20 and 20ª. (See Figs. 1 and 6, where these pins are shown.) The pins 20 and 20ª are located one at each side of the eccentric 16 and rest in small depressions 16ª, while the clutch-block is in the position shown in Figs 6 and 8, their object being to keep the arm 18 in this position until the eccentric is moved. These pins 20 and 20ª are rigidly secured to the clutch-ring, so that every time the cam 16 (which lies between them) is turned to one side or the other the clutch-ring is moved to bring the clutch-block into or out of action within the groove 3, as will fully appear farther on. At the top of the cam-arm 13 is pivoted a connecting-rod 21, having its opposite end pivoted to a hand-lever 22. The lower end of the hand-lever 22 is pivoted to a support 23. (See Fig. 1.) 24 represents a curved bar secured to supports on the base portion, which is provided with three notches 25, 26, and 27.

The standard 29 is rigidly secured to the base 30 or other support. At the top of the standard is mounted on a shaft 30ª, so as to turn thereon, a double rock-arm 31 32. To the arm 31 is pivoted a connecting-rod 34, having its opposite end pivoted to the operating-arm 10ª, and to the lower arm 32 is pivoted a connecting-rod 35, having its opposite end pivoted to the operating-arm 10. Between the two arms 31 and 32 is rigidly secured (see Figs. 1 and 2) an arm 36, and to the arm 36 is pivoted by a pin 37 a connecting-rod 38, extending from an engine or other source of power for giving a reciprocating motion to the connecting-rods 34 and 35.

In Fig. 10 I have shown a modification of the device in which a rib 39 is employed instead of the groove 3, and a groove to fit it is placed in the clutch-block 4; but the construction heretofore described is preferred.

The operation of the device is as follows: Referring to Figs. 1, 8, and 9, when the lever-arm 22 is in a substantially vertical position, secured in the notch 26, (see Fig. 1,) the clutch-blocks are in the position shown in Fig. 8, and the arms 10 and 10ª may be reciprocated back and forth without moving or rotating the disk 1, the arm 18 being held by the cam 16 in its proper position during such time. When the lever-arm 22 is moved to the notch 25, the clutch-ring and clutch-block will be moved to one side, bringing the clutch-block 4 in the position substantially as shown in Fig 9, so that every time the operating-arm moves in the direction of the arrow V the disk will be moved in the same direction, because the clutch-ring, being mounted pivotally on the shaft 1ª, causes the clutch-block, when the operating-arm is moved in the direction of the arrow V, to bind without slipping at the points $e$ and $f$, (see Fig. 9,) and the disk therefore turns in that direction only. When the motion of the operating-arm is reversed, the clutch-block is relieved and slips easily backward.

It will be noticed that when it is desired to use a reversing mechanism there are two cam-arms 13 and two connecting-rods 21, each having a pivoted connection with the lever-arm 22, so that both are operated at the same time by said lever-arm 22. It will be further seen that when one clutch-block is in position for turning the disk one way the other is in position to slip easily and that both are alternately in action.

This device can be operated with a disk having a single annular groove or its equivalent, a single operating-arm, and a single starting, stopping, and reversing mechanism. This construction would not be as near continuous as the construction above described, but for many purposes it would answer nearly, if not quite, as well.

I have designed this device more especially for a horseless carriage, because the rotative disk can be instantly started or made to rotate in one direction or as quickly reversed, so as to operate in an opposite direction; or its action may be stopped and thereby instantly stop the wagon or carriage without in any way interfering with the operation or motion of the engine driving the operating-arms. This is a very important advantage in motor-wagons, especially where a gas, gasolene, or kerosene-oil engine is employed, which cannot be conveniently or practically stopped and started or reversed, as a steam-engine can.

Although this invention is especially designed for the above purpose, it is also well adapted for other uses.

I claim as my invention—

1. In mechanism for converting motion, a disk provided with circular grooves, clutch devices fitting in said grooves, and each having a convex side of greater curve than the outer side wall of the grooves and a concave side of lesser degree than the inner side of said groove, operating-arms pivotally connected to said clutch devices, means for vibrating said operating-arms and means for moving the clutch-blocks to operate from the center of the circular grooves or from one side or the other of said grooves.

2. In a device for converting motion, a disk provided with circular grooves, clutch devices fitting in said grooves, with their outer sides curved to a greater degree than the exterior circular side walls of the grooves and their inner sides curved to a lesser degree than the inner circular side walls of the grooves, operating-arms for imparting a vibratory movement to said clutch devices, and independent hand-operated mechanism controlling said clutch devices for moving them to vibrate either from the center of said disk and thus move freely in either direction in said grooves, or to one side or the other of said center, to clutch and rotate the disk in the direction desired.

3. In a device for converting motion, a disk secured on a shaft set in suitable boxes so as to be rotatable and provided with an annular groove at each opposite side, a clutch-block fitted in each annular groove, and having its sides of greater and lesser curve respectively than the adjacent outer and inner side walls of the groove, an operating-arm mounted on said shaft at each side of said disk and having a pivotal connection with the clutch-blocks, mechanism for vibrating said operating-arms, and means for moving the clutch-blocks into or out of engagement with the annular grooves at either side of the center of the disk or for holding them in a line with said center, for the purpose described.

4. In a device for converting motion for a horseless carriage, a disk secured to a shaft in boxes so as to be rotatable and provided with an annular groove, a clutch-block fitted in the annular groove with its side faces convexed and concaved to a greater and lesser degree respectively than the adjacent side walls of the groove, and having a supporting connection an operating-arm mounted on the shaft at one side of the disk and pivoted to the supporting connection of the clutch-block, means for vibrating the operating-arm, and means for moving the clutch-block to change the position of its convexed and concaved sides with respect to the side walls of the groove and thereby rotate the disk in either direction or not at all while the block is in continuous vibration.

5. In a device for converting motion, a disk mounted on a shaft set in bearings so as to be capable of rotation and provided with an annular groove in each of its two opposite faces, in combination with two operating-arms, one at each side of said disk and mounted on its supporting-shaft, two clutch-blocks, one mounted in each opposite groove, at one side of the center of the disk and having a pivotal connection with an operating-arm at the opposite side of the center of said disk and a cam for moving and holding the clutch-blocks directly in a line with the center of the disk or to one side or the other of said center, for rotating the disk in either direction or stopping it, while the vibrating arms are in continuous action.

6. In a device for converting motion for a horseless carriage, a disk secured to a shaft in boxes so as to be rotatable and provided with an annular groove, a clutch-block fitted in the annular groove with its side faces convexed and concaved to a greater and lesser degree respectively than the adjacent side walls of the groove, and having a supporting connection, an operating-arm mounted on the shaft at one side of the disk and pivoted to the supporting connection of the clutch-block, means for vibrating the operating-arm and a cam device connected to the clutch-block for moving said clutch-block to change the position of its convexed and concaved sides with respect to the side walls of the groove and thereby rotate the disk in either direction or not at all while the block is in continuous vibration.

HENRY R. BIRD.

Witnesses:
JAMES SANGSTER,
G. A. NEUBAUER.